United States Patent
Wisecarver

(10) Patent No.: US 7,104,398 B1
(45) Date of Patent: Sep. 12, 2006

(54) PROTECTIVE CASE FOR NIGHT VISION GOGGLES

(76) Inventor: Richard A. Wisecarver, 303 Sourthern Rd., River Ridge, LA (US) 70123

(*) Notice: Subject to any disclaimer, the term of this patent is extended or adjusted under 35 U.S.C. 154(b) by 173 days.

(21) Appl. No.: 10/462,538

(22) Filed: Jun. 16, 2003

Related U.S. Application Data

(60) Provisional application No. 60/398,763, filed on Jul. 26, 2002.

(51) Int. Cl.
*B65D 85/38* (2006.01)

(52) U.S. Cl. .................. 206/316.3; 206/523

(58) Field of Classification Search ............ 206/316.3, 206/316.1, 316.2, 320, 570, 523
See application file for complete search history.

(56) References Cited

U.S. PATENT DOCUMENTS

| | | | | |
|---|---|---|---|---|
| 2,478,267 A * | 8/1949 | Hickler | ............... | 428/36.2 |
| 3,307,757 A * | 3/1967 | Gatos et al. | ........... | 224/629 |
| 3,782,614 A * | 1/1974 | Campisi | .................. | 2/251 |
| 3,910,470 A * | 10/1975 | Swenson et al. | ........ | 224/610 |
| 4,093,010 A * | 6/1978 | Hunley et al. | ......... | 206/316.2 |
| 4,119,248 A * | 10/1978 | Butler et al. | ......... | 224/148.3 |
| 4,173,286 A * | 11/1979 | Stanko | ................ | 206/433 |
| 4,228,908 A * | 10/1980 | Tweeton | .............. | 215/11.6 |
| 4,628,705 A * | 12/1986 | Nave | ................. | 62/457.5 |
| 4,703,519 A * | 10/1987 | Krenzel | ................ | 383/97 |
| D343,289 S | 1/1994 | Duley | | |
| 5,356,004 A | 10/1994 | Weinreb | | |
| D369,676 S | 5/1996 | Palmer | | |
| D376,690 S | 12/1996 | Lockerby | | |
| 5,662,219 A * | 9/1997 | Tschudy et al. | ........... | 206/317 |
| 5,996,865 A | 12/1999 | Bissey | | |
| 6,021,983 A | 2/2000 | Congdon | | |
| 6,152,303 A * | 11/2000 | Ducote et al. | ............. | 206/703 |

OTHER PUBLICATIONS

Binocular case by AccuCase, published 2001.*

* cited by examiner

*Primary Examiner*—Shian T. Luong
(74) *Attorney, Agent, or Firm*—Garvey, Smith, Nehrbass & North, L.L.C.; Gregory C. Smith

(57) ABSTRACT

A protective case for Integrated Panoramic Night Vision Goggles (IPNVG) which includes a first container portion having a rigid protective exterior, and a top portion having a rigid exterior, the container and top portions connected along a common edge, so as to define a clamshell type container. The container portion further provides a soft optical foam interior, with the foam interior including a carved out space for receiving a set of IPNVG therein. There is further provided a plurality of openings for defining storage spaces for extra batteries in the case. The top portion also provides a soft optical foam interior which conforms to the interior of the top portion, so that when the top portion is closed upon the container portion, there is provided a zipper which forms an enclosure of the top and container portions for defining a rigid exterior protective case for the night vision goggles, yet allowing the goggles to be positioned within a soft optical foam interior for protection and safety.

13 Claims, 3 Drawing Sheets

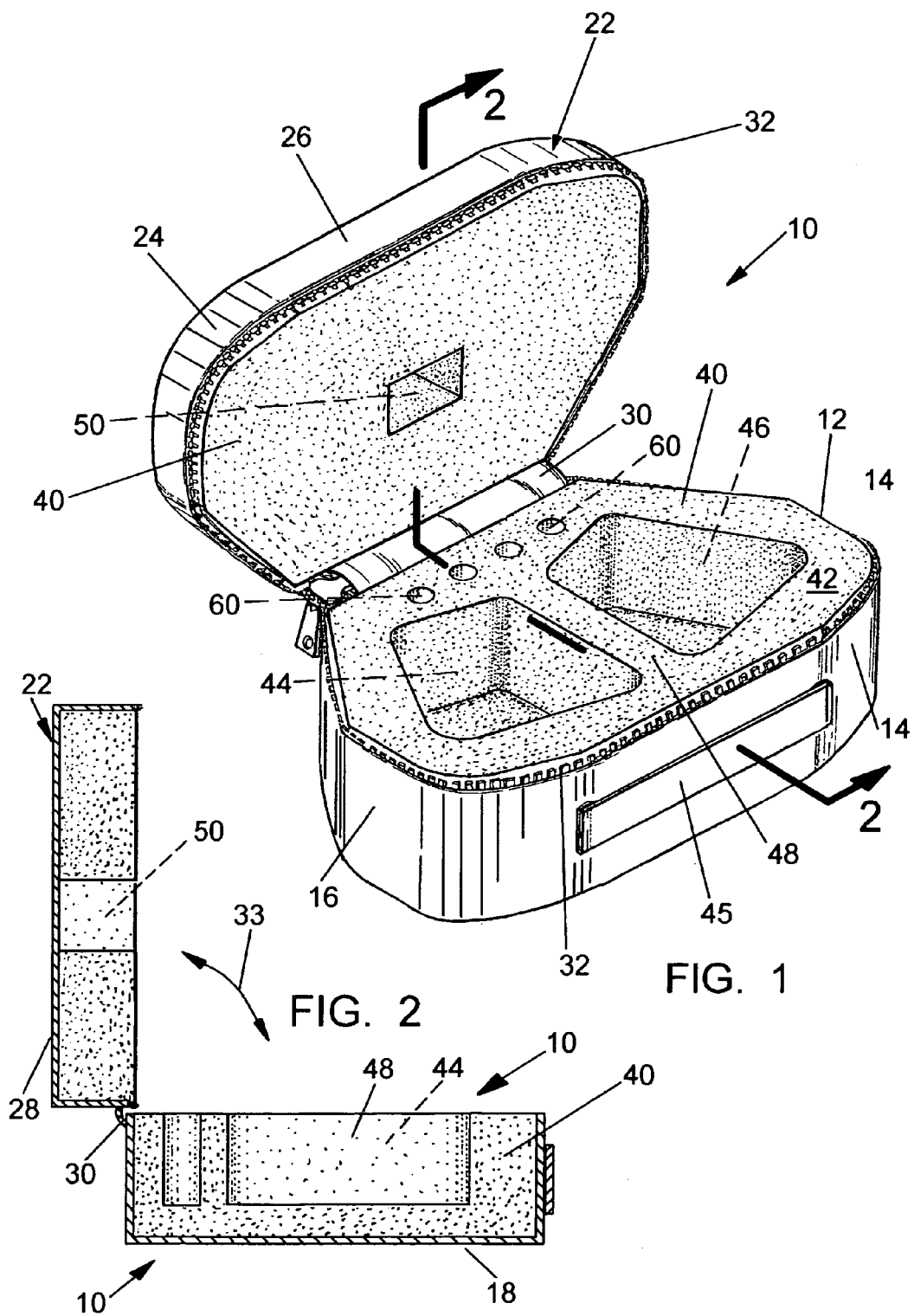

PROTECTIVE CASE FOR NIGHT VISION GOGGLES

CROSS-REFERENCE TO RELATED APPLICATIONS

This application claims priority of provisional patent application entitled "Protective Case for Night Vision Goggles" Ser. No. 60/398,763, filed on Jul. 26, 2002, by the same inventor, which is fully incorporated herein by reference thereto.

STATEMENT REGARDING FEDERALLY SPONSORED RESEARCH OR DEVELOPMENT

Not applicable
REFERENCE TO A "MICROFICHE APPENDIX"
Not applicable

BACKGROUND OF THE INVENTION

1. Field of the Invention

The present invention relates to night vision goggles. More particularly, the present invention relates to a protective carrier and storage case for integrated panoramic night vision goggles (IPNVG), to provide a durable, protective case for the goggles while under soft interior environment.

2. General Background of the Invention

One of the instruments utilized by pilots in the cockpit of fighter aircraft such as F15, F16, A10 and F22 and others, are night vision goggles, also referred to as IPNVG, in order for the pilot to view certain exterior features during night flights. Working within the safety of flight issues such as space/cockpit management, there is a need to protect the IPNVG in the cockpit, yet be engineered in such a manner so as to reduce the possibility of the night vision goggle case catching on cockpit surfaces, the ejection seat handles, or other aircraft instrumentation which would compromise the safety of the flight and the mission accomplishment goals. Therefore, there is a need in the art for a container for IPNVG which has a hard protective exterior which would prevent the IPNVG from damage incurred in drops or falls, punctures, and general mistreatment. The container would have a rounded shape so as to avoid contact with instruments within the cockpit, and to provide easy storage, and yet a soft compressible interior so that the IPNVG is protected from scratches and has the greatest possible cushioning affect.

BRIEF SUMMARY OF THE INVENTION

The apparatus of the present invention solves the aforesaid problems confronted in the art in a simple and straightforward manner. What is provided is a protective case for IPNVG which includes a first container portion having a rigid protective exterior, and a top portion having a rigid exterior, the container and top portions connected along a common edge, so as to define a clamshell type container. The container portion further provides a soft optical foam interior, with the foam interior including a carved out space for receiving a set of IPNVG therein. There is further provided a plurality of openings for defining storage spaces for extra batteries in the case. The top portion also provides a soft optical foam interior which conforms to the interior of the top portion, so that when the top portion is closed upon the container portion, there is provided a zipper which forms an enclosure of the top and container portions for defining a rigid exterior protective case for the night vision goggles, yet allowing the goggles to be positioned within a soft optical foam interior for protection and safety.

Therefore, it is a principal object of the present invention to provide an IPNVG protective case to give protection to the new generation NVG, as currently being designed and tested by AV Tech Research Corp., Insight Technologies, and AFRL;

It is a further object of the present invention to provide a protective case for IPNVG which has a soft case shape to reduce the possibility of catching on surfaces within the cockpit, yet provides a rigid case for protection of the IPNVG while stored in the cockpit;

It is a further object of the present invention to provide a protective case for IPNVG which allows compressibility of the case combined with utilizing the smallest possible case design, while not sacrificing IPNVG protection;

It is a further object of the present invention to provide an IPNVG soft case which can be inserted into the cockpit map case or fighter aircraft such as F15, F16, A10 and F22, and can be stored therein;

It is a further object of the present invention to provide an IPNVG protective case made from the highest quality soft optical foam to insure the utmost in scratch protection of the night vision goggles and the greatest possible cushion effect so as to protect the goggles from drops, falls, punctures and other general mistreatment;

It is a further object of the present invention to provide a IPNVG protective case which also allows for storage of extra batteries in the case, which reduces safety flight issues, such as lost batteries in the cockpit.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall the preferred embodiment of the IPNVG protective case of the present invention in the open configuration;

FIG. 2 illustrates a cross-sectional view along lines 2—2 in FIG. 1 of the preferred embodiment of the IPNVG protective case of the present invention;

DETAILED DESCRIPTION OF THE INVENTION

Figure 3:
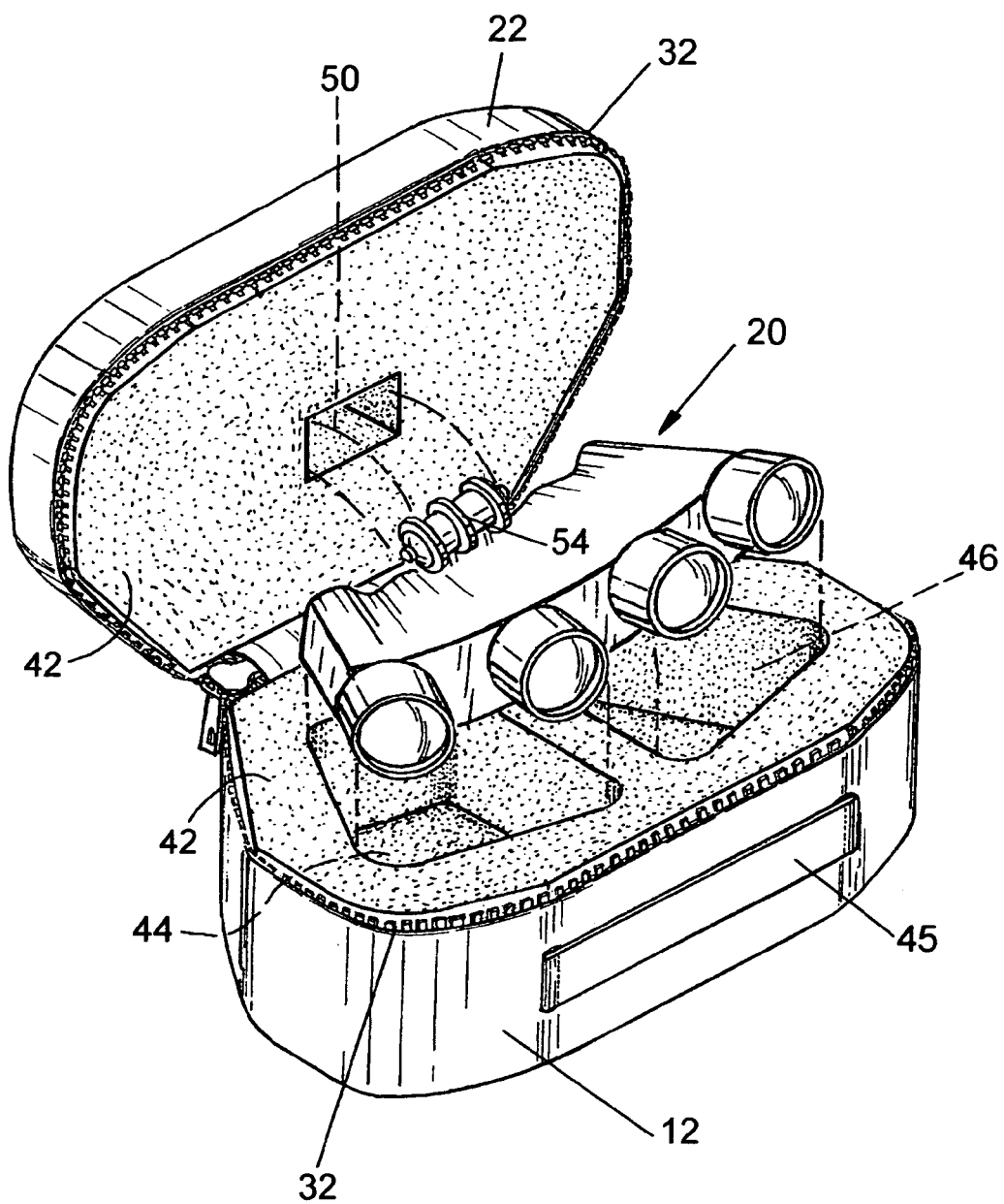
FIG. 3 illustrates an overall the preferred embodiment of the IPNVG protective case of the present invention with a pair of IPNVG being positioned therein.
Figure 4:
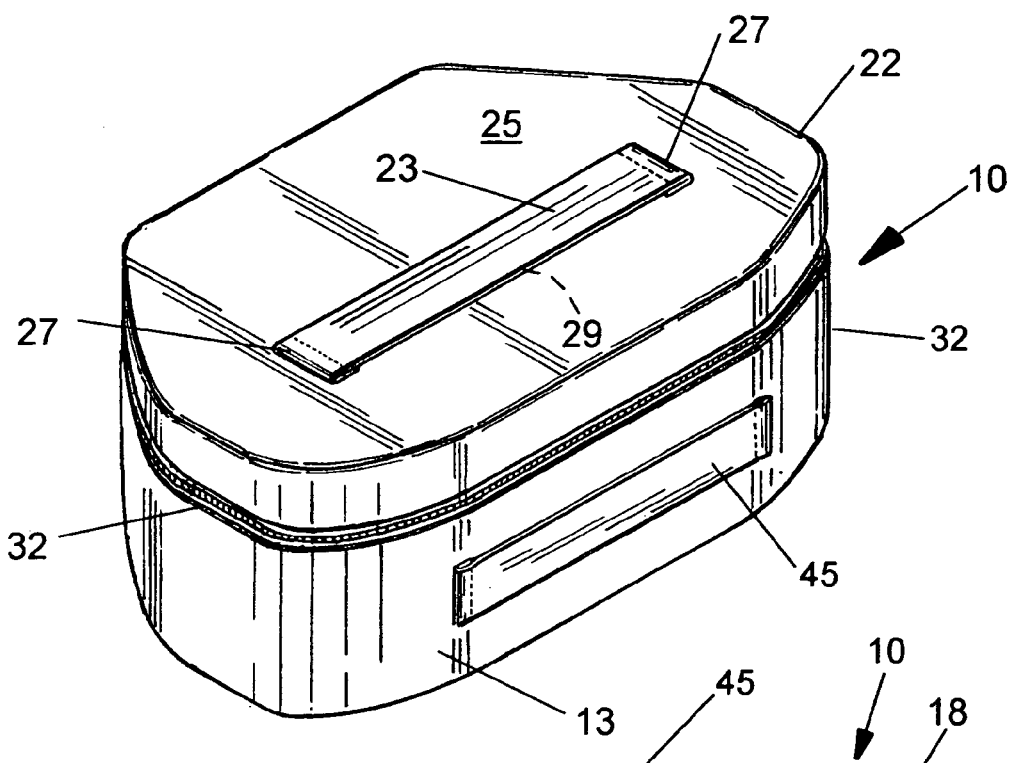
FIG. 4 illustrates a view of the IPNVG protective case in the closed mode, with a pair of night vision goggles set therein.
Figure 5:
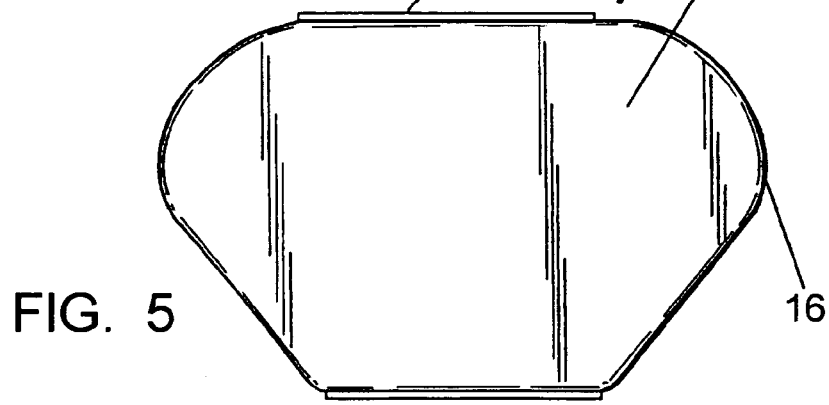
FIG. 5 illustrates a bottom view of the IPNVG protective case of the present invention.
Figure 6:
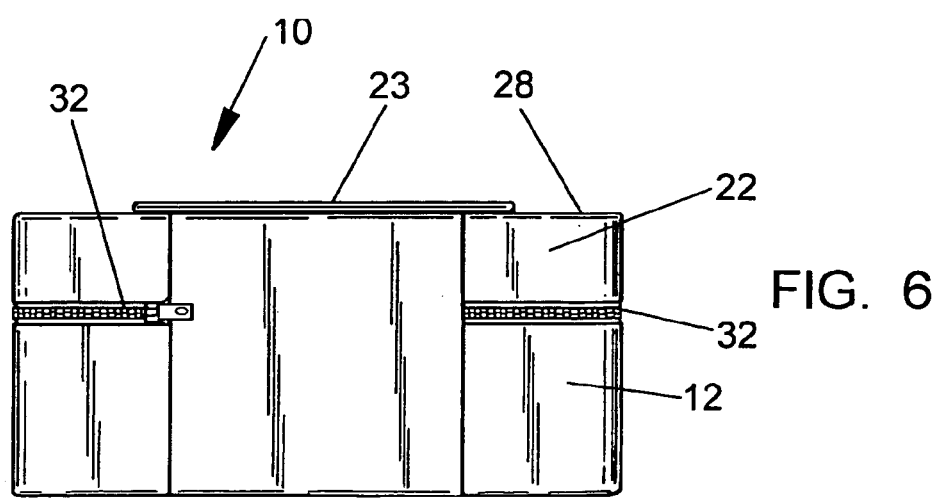
FIG. 6 illustrates a rear view of the IPNVG protective case of the present invention.

FIGS. 1–6 illustrate the preferred embodiment of the apparatus or IPNVG protective case of the present invention by the numeral 10. As illustrated, particularly in the figures, apparatus or protective case 10 comprises a first container portion 12 having a somewhat non-oblong configuration, which is designed not to include sharp corners or the like, as illustrated in FIG. 1, but specifically configured to house a pair of IPNVG therein. Container portion 12 provides an outer hard protective shell 14 having a continuous side wall 16 and a base or floor portion 18, as is seen in FIG. 5. Preferably the exterior hard shell 14 would be constructed of a heavy duty nylon material combined with a special parachute thread for defining the durable outer case capable of protecting an IPNVG 20, of the type as illustrated in FIG. 3. Further as illustrated in FIGS. 2 and 4, the protective case 10 would further define a top portion or cover 22 also having a heavy duty nylon outer shell 24 with a wall 26 and an upper portion 28. The top portion 22, as seen in FIG. 4, would include a carrying handle 23, which is secured to the outer surface 25 of top portion 22, at each end 27 of handle 23, defining a space 29 for grasping handle 23.

As is further illustrated in the figures, the container portion 12 and the top portion 22 are connected along a common edge 30 which allows the top to move between open and closed positions, in the direction of arrow 33, to serve its protective function. There is also provided a zipper 32 along the entire disengagable edge between top portion 22 and container portion 12. Zipper 32 would be either be one continuous zipper or a pair of zippers so that when the zipper 32 is zipped closed, it defines the closed protective case 10 as is illustrated in FIG. 4.

Returning now to FIGS. 1 and 2, within the interior of the protective shell 14, there is included a soft, compressible material 40. This protective material comprises a high quality soft, optical foam 42 which defines a soft protective cushion for the IPNVG 20 that would be placed therein, as seen in FIG. 3. The soft material 40 would include a pair of carved out portions 44 and 46 with a protective cushion wall 48 there between, as seen in cross-section in FIG. 2. These carved out portions 44 and 46 would define the openings which would house the IPNVG 20 when the IPNVG 20 is placed therein, as illustrated in FIG. 3. The protective wall 48 would simply serve as a means for allowing the two central body portions 21 of the IPNVG to be protected therein when being stored away as illustrated in FIG. 3.

Further, as illustrated, the top portion 22 would likewise contain the protective foam 42 and would include a carved away central portion 50, as seen in FIG. 2, so that when the top portion 22 is closed upon the container portion 12, the uppermost member 54 of goggles 20 would rest therein for protection when the case 10 is in the closed position.

As further illustrated in FIGS. 1–2, there is also included a plurality of openings 60, which would in the preferred embodiment would include four openings 60, each of which would have the ability to accommodate a battery therein, so that the night vision goggles 20, as stored in container 12, could include an extra set of batteries so as to provide a greater level of protection, should the batteries within the goggles 20 lose power.

Returning to FIG. 4, there is illustrated the protective case 10 in the closed position, with the zippers 32 having been fully closed in this particular view. As illustrated in FIG. 4, in the preferred embodiment, there would be a set of the IPNVG goggles 20 within the case 10 when the case is closed, after the goggles 20 are set therein as being done in FIG. 3. The handle 23, as discussed earlier, would allow the case 10 to be easily carried around and placed into the cockpit of a plane and stored therein until used. Further, as seen in FIG. 4, the case 10 would include a second handle 45, similar to the handle 23 on the top portion 22 of case 10, but handle 45 placed on the front portion 13 of the case 10, in the same manner as handle 23, for allowing carrying of the case 10 in this fashion.

It should be made clear that it is the combination of the rigid exterior 14 and the interior soft compressible optic foam material 42, having the carved out portions 44 and 46 in the lower material 42, and the carved out portion 50 in the top foam material 42 which allows the IPNVG goggles 20 to be stored within a very soft environment that would prevent damage to the goggles; yet have a protective exterior outer shell 14 which would protect the IPNVG goggles 20 from exterior trauma during flight within the cockpit.

Finally, FIGS. 1 through 6 illustrate the preferred embodiment, in terms of dimensions and construction, of the present invention, for providing protection for the IPNVG goggles, including the preferred thickness of the interior optic foam 42 and the depth of the cut out spaces 44,46 within the optic foam 42 in which the goggles 20 would rest. Although the dimensions are preferred, it is foreseen that various dimensions may apply in various cases, depending on the type of goggles that have been stored and the change in the shape and size of the goggles during the course of the improvement of the art.

In the preferred embodiment, the thread utilized would be Nylon, Size E, 8 oz., with a tensile strength of 8.5 lbs., or equivalents of these specifications. Although the weave size may vary depending on various factors, the fabric, in the preferred embodiment would be Cordura Nylon 1000 Denier coated one side for waterproof finish. The Nylon webbing would be Type 17, 1 inch wide, with a tensile strength of 2500 lbs, in the preferred embodiment. These specifications cited above may be changed to equivalent specifications depending on certain factors.

PARTS LIST

The following is a list of parts and materials suitable for use in the present invention:

integrated panoramic night vision goggles (IPNVG)

| Description | Part No. |
| --- | --- |
| protective case | 10 |
| container portion | 12 |
| front portion | 13 |
| outer hard shell | 14 |
| sidewall | 16 |
| floor portion | 18 |
| IPNVG | 20 |
| central portion | 21 |
| cover or top portion | 22 |
| carrying handle | 23 |
| outer shell | 24 |
| outer surface | 25 |
| wall | 26 |
| ends | 27 |
| upper portion | 28 |
| space | 29 |
| common edge | 30 |
| zipper | 32 |
| arrow | 33 |
| soft, compressible material | 40 |
| optical foam | 42 |
| carved out portions | 44, 46 |
| second handle | 45 |
| protective cushion wall | 48 |
| central portion | 50 |
| uppermost member | 54 |
| openings | 60 |
| carrier handle | 64 |

All measurements disclosed herein are at standard temperature and pressure, at sea level on Earth, unless indicated otherwise. All materials used or intended to be used are biocompatible, unless indicated otherwise.

The foregoing embodiments are presented by way of example only; the scope of the present invention is to be limited only by the following claims.

The invention claimed is:

1. A protective case for integrated panoramic night vision goggles (IPNVG), of the type having a first and second body portions and an upper member positioned on the two body portions, the case comprising:
   a. a container portion having a rigid protective exterior of a heavy duty nylon webbing, with a tensile strength of at least 2,500 lbs.;
   b. a soft, compressible optic foam material contained within the protective exterior;
   c. first and second carved out portions formed in the soft, compressible optic foam material each for housing the first and second body portions of the night vision goggles therein, and further defining a protective wall of compressible material therebetween;
   d. a top portion having a rigid protective exterior of the heavy duty nylon webbing, likewise with a tensile strength of at least 2,500 lbs., also containing the soft compressible optic foam material, including an opening formed in the soft compressible optic foam material for receiving the upper member thereinto; the top portion engageable onto the container portion with a zipper extending around the perimeter of the container and top portions when the zipper is closed, for defining a closed container for protecting the night vision goggles secured within the optic foam material and the heavy duty nylon webbing.

2. The protective case in claim 1, wherein the rigid protective exterior comprises nylon material sewn with parachute thread.

3. The protective case in claim 1, wherein the container is shaped to avoid sharp corners and edges.

4. The protective case in claim 1, further comprising a plurality of openings in the soft, compressible material for housing extra batteries for the night vision goggles.

5. A protective case for night vision goggles, of the type having a first and second body portions and an upper member positioned on the two body portions, the case comprising:
   a. a container having a rigid exterior of a heavy duty nylon webbing, with a tensile strength of at least 2,500 lbs.;
   b. optic foam compressible material positioned within the heavy duty nylon webbing container;
   c. first and second carved out portions formed in the optic foam material each to receive the first and second body portions of night vision goggles, and further defining a protective wall of optic foam compressible material between the first and second body portions when stored in the container;
   d. a rigid top portion to the container, likewise of a heavy duty nylon webbing, with a tensile strength of at least 2,500 lbs. containing the compressible optic foam material, including an opening formed in the compressible optic foam material for receiving the upper member of the night vision goggles therein to receive the upper member thereinto;
   e. a zipper closeable along a common edge between the top portion and the container to secure the top portion to the container so that the compressible optic foam material defines a soft protective interior and the rigid protective exterior of the heavy duty nylon webbing defines a protective barrier for the night vision goggles.

6. The protective case for night vision goggles in claim 5, further comprising integrated panoramic night vision goggles.

7. The protective case for night vision goggles in claim 5, further comprising a handle portion on the top portion for carrying the container.

8. The protective case for night vision goggles in claim 5, wherein the container defines a means which allows the container to be stored in compact places within a cockpit and avoids snaring the container on objects within the cockpit.

9. A protective case for integrated panoramic night vision goggles, the case comprising:
   a. a container, having a lower body portion and a top portion, the container having a rigid exterior of a heavy duty nylon webbing, with a tensile strength of at least 2,500 lbs.;
   b. a soft, compressible optic foam material within the lower body portion of the heavy duty nylon webbing container;
   c. first and second carved out portions formed in the compressible optic foam material, and further defining a protective wall of compressible material between the two carved out portions, the first and second carved out portions housing the first and second body portions of night vision goggles;
   d. the top to the container likewise containing compressible optic foam material, including an opening formed in the compressible, soft material for receiving the upper member thereinto;
   e. an opening formed in the compressible optic foam material of the top portion;
   f. a pair of integrated panoramic night vision goggles positioned upon the soft, compressible optic foam material of the lower body portions, portions of the goggles housed within the first and second openings in the lower body portion, and an upper portion of the goggles housed within the opening in the compressible optic foam material of the top portion when the top portion is moved to a closed position; and
   e. a zipper to secure the top portion to the lower body portion of the container when the top portion is moved to the closed position and the zipper is closed to define a soft protective interior and a rigid protective exterior of the heavy duty nylon webbing for the integrated panoramic night vision goggles.

10. The protective case in claim 9, wherein the container defines a means which allows the container to be stored in compact places within a cockpit and avoids snaring the container on objects within the cockpit.

11. The protective case in claim 9, further comprising a handle portion on the top portion of the container for carrying the container.

12. The protective case in claim 9, further comprising a handle portion on a sidewall of the lower body portion for carrying the container.

13. The protective case in claim 9, further comprising openings formed in the soft, compressible material of the lower body portion for housing batteries for the integrated panoramic night vision goggles.

\* \* \* \* \*